United States Patent [19]

Gangeme et al.

[11] Patent Number: 4,915,612
[45] Date of Patent: Apr. 10, 1990

[54] EXTRUSION DIE ASSEMBLY FOR FORMING HONEYCOMB STRUCTURES HAVING THICKENED OUTER SKIN

[75] Inventors: John R. Gangeme, Painted Post; Richard D. Putt, Corning, both of N.Y.

[73] Assignee: Corning Incorporated, Corning, N.Y.

[21] Appl. No.: 302,013

[22] Filed: Jan. 26, 1989

[51] Int. Cl.$^4$ ............................................. B29C 47/12
[52] U.S. Cl. .................... 425/464; 264/177.1; 264/177.11; 264/177.12; 425/465; 425/466
[58] Field of Search .............. 425/198, 199, 461, 463, 425/464, 465, 466; 264/177.1, 177.11, 177.12

[56] References Cited

U.S. PATENT DOCUMENTS

| | | | |
|---|---|---|---|
| 3,836,302 | 9/1974 | Kaukeinen | 425/461 |
| 4,278,412 | 7/1981 | Ozaki et al. | 425/198 |
| 4,362,495 | 12/1982 | Naito et al. | 425/466 |
| 4,368,025 | 1/1983 | Naito et al. | 425/462 |
| 4,384,841 | 5/1983 | Yamamoto et al. | 425/461 |
| 4,814,187 | 3/1989 | Inoue et al. | 425/464 |

Primary Examiner—Jay H. Woo
Assistant Examiner—Timothy W. Heitbrink
Attorney, Agent, or Firm—Charles Q. Buckwalter, Jr.; Richard N. Wardell

[57] ABSTRACT

An extrusion die assembly for making honeycomb structures of ceramics, glass, and other extrudable materials. The assembly is provided with an apertured, flow controlling forming plate placed against the input (upstream) surface of the extrusion die. The forming plate has a central opening through which the batch material to the input face of the die passes. A series of angularly spaced, flow controlling openings lies radially outwardly of the rim of this central opening. These forming plate openings are axially aligned with a shim reservoir downstream of the discharge slots of the die. This arrangement permits both the flow volume and rate of the batch material being extruded to the skin forming portions of the die assembly to be at least partially independently controlled relative to the flow volume to the main, radially central portion of the extrudate. By this construction, the formation of air checks in the shim reservoir and the formation of rippled skin on the extrudate is inhibited.

11 Claims, 4 Drawing Sheets

EXTRUSION DIE ASSEMBLY FOR FORMING HONEYCOMB STRUCTURES HAVING THICKENED OUTER SKIN

BACKGROUND OF THE INVENTION

This invention relates to an extrusion die assembly for forming honeycomb structures from extrudable materials such as glass, glass-ceramics, ceramics, plastics, metals, cermets and other materials, especially those in particulate form, which are capable of being extruded through relatively small feed holes or channels whose length is several times their diameter or transverse dimension. The outlet ends of the feed holes communicate with grid forming discharge slots, these slots forming the cell walls of a honeycomb form extrudate. After the extrusion process, the honeycomb is treated to produce a rigid honeycomb structure as is known in this art.

Thin-walled honeycomb structures display utility in a variety of technologies. For example, thin-walled honeycomb structures fashioned from ceramic materials are used as catalyst carriers in catalytic converters in the exhaust system of internal combustion engines. They also are employed as radiators, catalyst carriers, filters, diesel particulate filters, molten metal filters, woodstove combustor substrates, and heat exchangers.

This invention more specifically relates to an extrusion die assembly for producing a thickened skin or thickened outer wall on the surface of the extruded honeycomb structure. Without such a thickened skin, the external surface of the extrudate is defined by elongated ridges, the individual ridges being the exposed outer walls of the outermost honeycomb passageways of the fasces-like extruded structure or extrudate. The thickness of the outer surface is merely the wall thickness of the individual honeycomb passageways which form the elongated ridges. Workers in this art have recognized that the mechanical strength of the extrudate can be increased by modifying the extrusion process so that the extruded structure will have a thickened outer surface or skin so as to be thicker than the honeycomb cell walls. This is usually effected by deforming or crushing the elongated honeycomb cells at the periphery of the extrudate as the extrudate emerges from the die. This has been done by providing a ring with a radially inwardly extending lip, the lip distorting or changing the axial output direction of the flowable material passing through the periphery of the die discharge slots. The ring is often spaced from the face of the discharge slots by a shim, the region between the lip, shim and discharge slots forming a shim reservoir for the batch material being extruded. Such a ring is often termed a mask. A backer plate and flow diverter have also been used, the latter two elements being positioned on the inlet or upstream side of the die. The mask, the die, the shim and other elements being referred to herein as an extrusion die assembly.

The prior art is aware of extrusion die and mask arrangements for forming thin-walled honeycomb structures having a thickened outer wall, such as shown in U.S. Pat. Nos. 4,278,412 issued to Ozaki, 4,368,025 issued to Niato, and 4,384,841 issued to Yamamoto.

While generally satisfactory for forming a thickened outer skin, these typical known arrangements cannot provide consistent batch flow to the shim reservoir to form thicker skin. Forming thicker skin results in higher levels of air checks, distortion, and rippled skin. Further, the use of a flow diverter/backer plate for flow control results in more misshape and fissures on high footage dies.

SUMMARY OF THE INVENTION

According to the practice of this invention, a forming plate is positioned at the input or upstream face of the die, the forming plate having a central opening congruent with the cross sectional shape of the extruded structure. The output or downstream region of the apparatus is provided, conventionally, with a mask and skin. A plurality of flow controlling openings extend through the forming plate and are located radially outwardly of the edge of the forming plate central opening. This construction increases the overall volume of batch material which flows to the skin forming region (mask and shim) and also controls the flow rate. The forming plate makes intimate contact with the die input face to thereby achieve accurate metering of the amount of batch material which forms the thickened skin. The die discharge slots which are axially aligned with the flow controlling openings may optionally be widened, so that the batch material passing through those die feed holes which are axially aligned with the flow controlling openings passes into the widened discharge slot region and thence into the skin forming region at the periphery of the die discharge slots.

Therefore, this invention is directed toward an extrusion die assembly for extruding a structure having a thickened outer skin, the assembly including an extrusion die having a plurality of axially extending and generally parallel feedholes, the die having an inlet face and an outlet face, the outlet face having a plurality of discharge slots, the latter being associated with by rows and columns of axially extending pins integral with the die, characterized by, a die mask at the periphery of the discharge end of the die, the mask having a radially inwardly extending lip axially spaced downstream from the ends of said pins and overlying an annularly continuous peripheral region of the die outlet face, said mask lip having an edge, said mask lip exerting a radially inwardly directed force on the extruded material passing through the central portion of the die to thereby form a thickened skin on the material being extruded, a forming plate positioned over the die inlet face and in surface contact therewith, said forming plate having a central opening congruent with the cross sectional shape of the structure being extruded, the forming plate having a plurality of axially extending, flow controlling openings spaced radially inwardly from the edge of said forming plate central opening, each of said flow controlling openings being aligned with and adapted to feed the input end of at least one die feedhole.

The flow controlling openings, which may be groove shaped or slots as well as holes, in the above assembly can be the same, larger, smaller, and/or a combination of sizes in relation to the feedholes. A portion of the die outlet face which is overlied by the mask lip in the above assembly the lip combining an annular groove extending inwardly of the die from the outlet face.

Additionally, the invention is directed to an extrusion die assembly for extruding a structure having a thickened outer skin, the assembly including an extrusion die having a plurality of axially extending and generally parallel feedholes, the die having an inlet face and an outlet face, the outlet face having a plurality of discharge slots, the latter being associated with rows and columns of axially extending pins integral with the die, characterized by, a die mask at the periphery of the discharge end of the die, the mask having a radially inwardly extending lip axially spaced downstream from the ends of said pins and overlying a peripheral region of the die outlet face, said mask lip projection having an edge, said mask lip exerting a radially inwardly directed force on the extruded material passing through the central portion of the die to thereby form a thickened skin on the batch material being extruded, means for independently controlling the volume and rate of flow of material which flows in a downstream direction towards and beneath said mask lip and which forms a thickened skin, whereby the volume of skin forming batch material can be varied substantially independently of the volume of batch material fed to the central portion of the die.

In distinction to prior extrusion die assemblies, for producing thickened skin extrudates, the present assembly permits a greater degree of separation of the volume of flow to the skin forming portions from the volume of flow to the main or radially central portion of the extrudate.

DETAILED DESCRIPTION OF THE INVENTION

Figure 1:
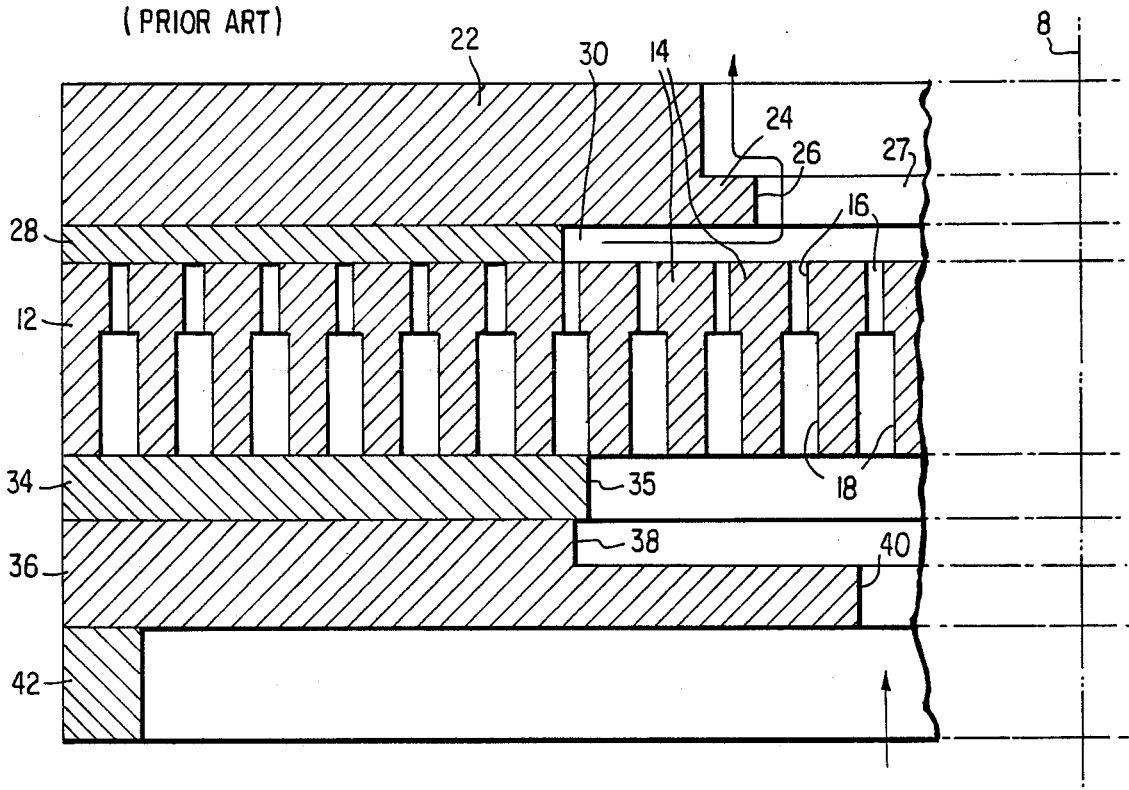
FIG. 1 illustrates a prior art extrusion die assembly, in (half) longitudinal cross section, for forming an extruded structure having a thickened skin.

Referring now to FIG. 1 of the drawings, a typical known construction for producing a honeycomb structure by die extrusion is illustrated. The numeral 12 denotes a die, usually metal, having a lower or inlet face and an upper or outlet face. The upper face is provided with a plurality of integral pins 14 associated with a plurality of criss crossing slots 16 which define the usual batch material discharge slots. The die 12 is provided with a plurality of axially extending feed holes 18 which feed corresponding discharge slots 16. The numeral 22 denotes a mask having a radially inwardly extending lip or projection 24, the latter having an edge 26 of an opening 27, which may have an annular configuration. The numeral 28 denotes a shim for spacing the mask from the free or upper ends of the pins 14. The shim and the lower projecting portion of the mask, together with associated pins 14, form a shim reservoir 30, which may be annular. The numeral 34 denotes a backer plate placed against the input surface of the die 12. The numeral 36 denotes a flow diverter plate having a radially inwardly extending portion terminating in a free edge 38 and a second radially inwardly extending portion 40. The numeral 42 denotes a shim. The axis 8 denotes the central longitudinal axis of the assembly, the axis running parallel to the central or main batch flow. The downstream portion of the assembly is here shown as the upper portion of FIG. 1.

In operation, the batch material is fed as indicated by the curved arrows into the feed holes. The material then exits through the discharge slots 16 and thence through orifice 27, with that portion of the batch discharge which is near the periphery of the extrudate being supplied from shim reservoir 30, which may be annular. The overhanging portion 24 of the mask 22 and the shim both compel the radially outermost portion of the batch material discharge to pass in the direction shown by the curved arrow at the discharge end of the discharge slots. This forms a thickened outer skin of the honeycomb extrudate.

As noted, this arrangement suffers several drawbacks and it has not been completely satisfactory.

Figure 2:
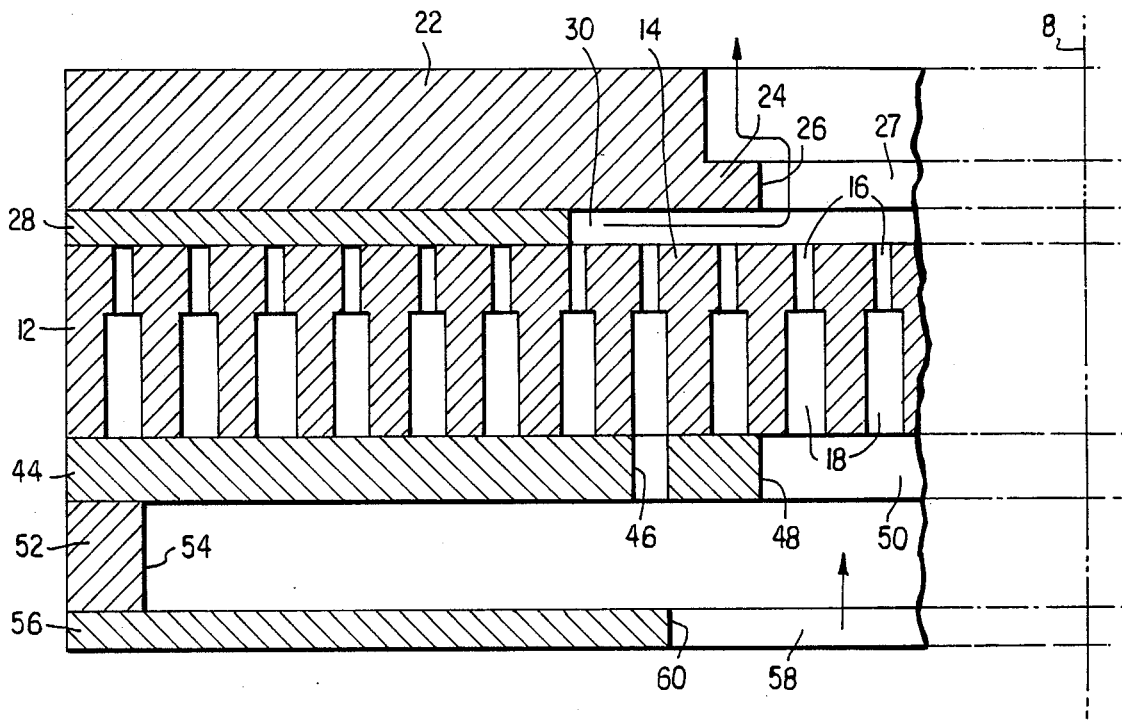
FIG. 2 is a view similar to FIG. 1 and shows the assembly of this invention.
Figure 3:
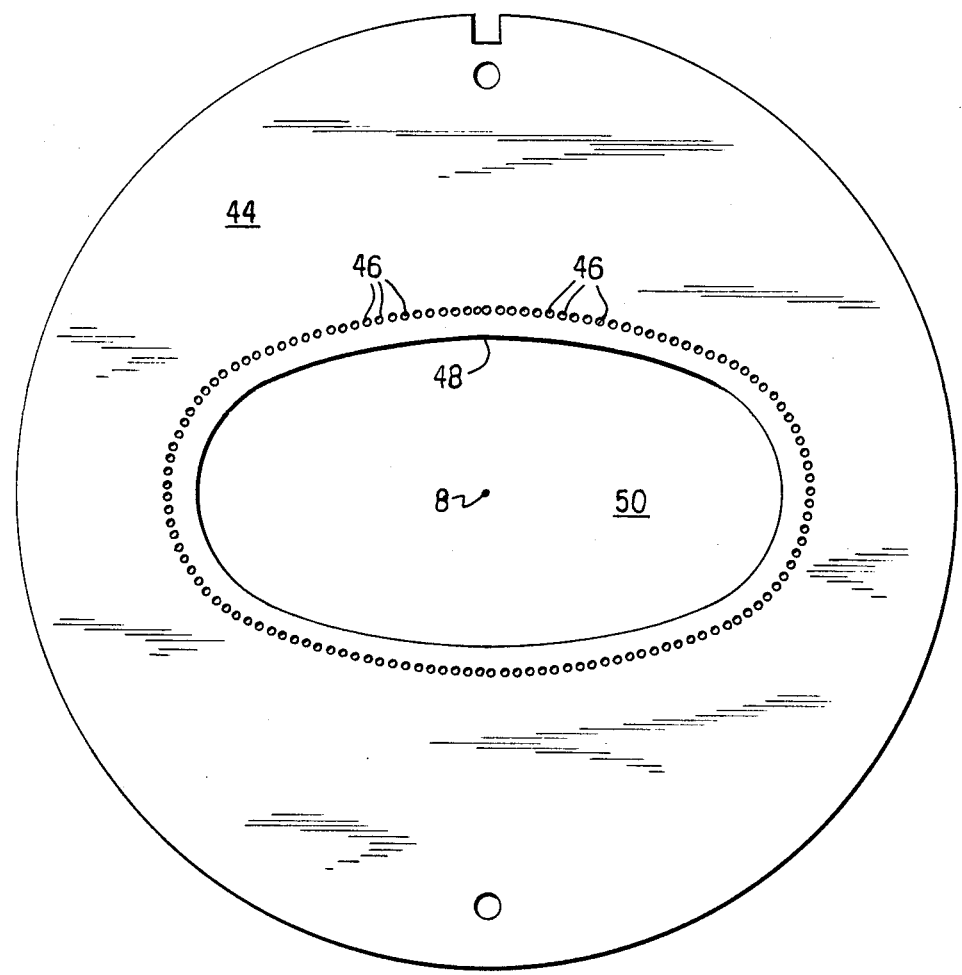
FIG. 3 is a plan view of the forming plate of this invention.

Referring now to FIGS. 2 and 3 of the drawings, the die assembly of this invention is illustrated. Those portions of the assembly which include the die 12 and all of the elements above the die are the same as shown at FIG. 1. However, instead of the backer plate 34 and flow diverter 36, a forming plate, shown in plan view at FIG. 3, is employed. The forming plate is denoted by the numeral 44 and includes a series of flow controlling openings 46, which may vary in diameter relative to feedholes 18 and may be arranged in an annular manner. These openings are positioned radially outwardly of the rim 48 of an opening 50 in the forming plate. Preferably, the shape of the opening 50 is congruent with the transverse cross sectional shape of the honeycomb extrudate produced by the assembly. An elliptical shape is illustrated in FIG. 3. The diameter of holes 46 is in the range of 0.02 to 0.25 inches, with the preferred range being 0.063 to 0.086 inches.

It will be observed that each flow controlling hole 46 of forming plate 44 feeds at least one feed hole 18 of die 12.

The function of the forming plate 44 and its openings 46 is to meter or control the volume of the batch material which reaches shim reservoir 30. From a consideration of FIG. 1, it is seen that the volume of batch material in shim reservoir 30 is dependent on the extent of the radial overhang of mask 22 over shim reservoir 30. The rate of flow of the batch material through the die and this shim volume determines the character of the thickened skin of the honeycomb extrudate. By the use of the forming plate 44 and its openings 46, the volume of the batch material reaching the shim reservoir is separated from the main mass (flowing parallel to axis 8) of the batch material, the latter passing through opening 50 of the forming plate. Thus the number of openings 46, their radial spacing from the rim 48 of opening 50, their diameter, can all be employed to determine the volume and the rate of flow of material fed to shim reservoir 30. Further, the diameter of openings 46 may be enlarged so that each feeds more than one die passageway or feed holes 18 of die 12. Additionally, the diameter of openings 46 may vary one from the next adjacent. Such variation will depend on the number of cells per square inch/centimeter of the substrate, the cell thickness, and the shape of openings 46 which may assume the form of slots instead of circular holes. Each of these variables makes possible some degree of separation of the flow volume and flow rate of the skin forming batch material from the main or radially central flow volume and flow rate of the batch material. It is seen that edge 26 of mask lip 24 is axially aligned with edge 48 of opening 50 of forming plate 44.

From a consideration of FIG. 2, it is readily seen that the time rate of flow of the material from reservoir 30 past edge 26 will, in general, be different from that of the corresponding time rate of flow for the material passing centrally through opening 27, nearer axis 8.

Figure 4:
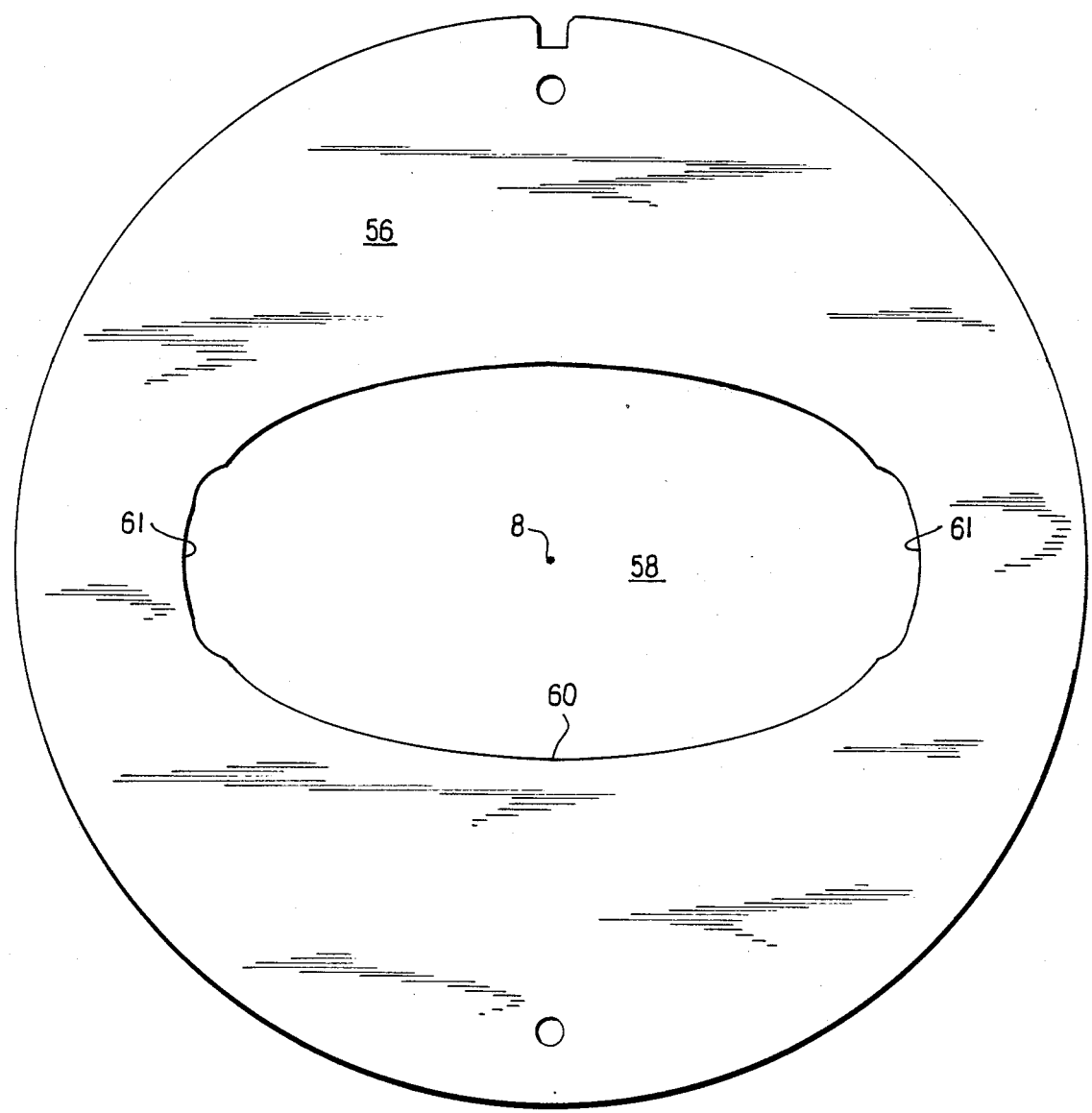
FIG. 4 is a plan view of the restrictor plate shown at the lower portion of FIG. 2.

Still referring to FIG. 2, a shim 52 having an inward radial edge 54 is positioned below and against forming plate 44. Shim 52 spaces flow restrictor plate 56, having a central opening 58, from forming plate 44. The rim of opening 58 is denoted by 60. Recesses 61 may be provided at the ends of the major axis of elliptical opening 58, as shown at FIG. 4. The use of flow restrictor plate 56 is optional and can be used to correct for unequal batch flow created by composition or the extruding apparatus, the batch flow being indicated schematically by 57 at FIG. 5. The batch feeding velocity can vary depending on viscosity of the batch material, condition of the extruding machine, and size and cell structure of the extruded body. The function of the flow restrictor is to equalize the batch flow before it reaches the forming plate/feedhole die.

Figure 5:
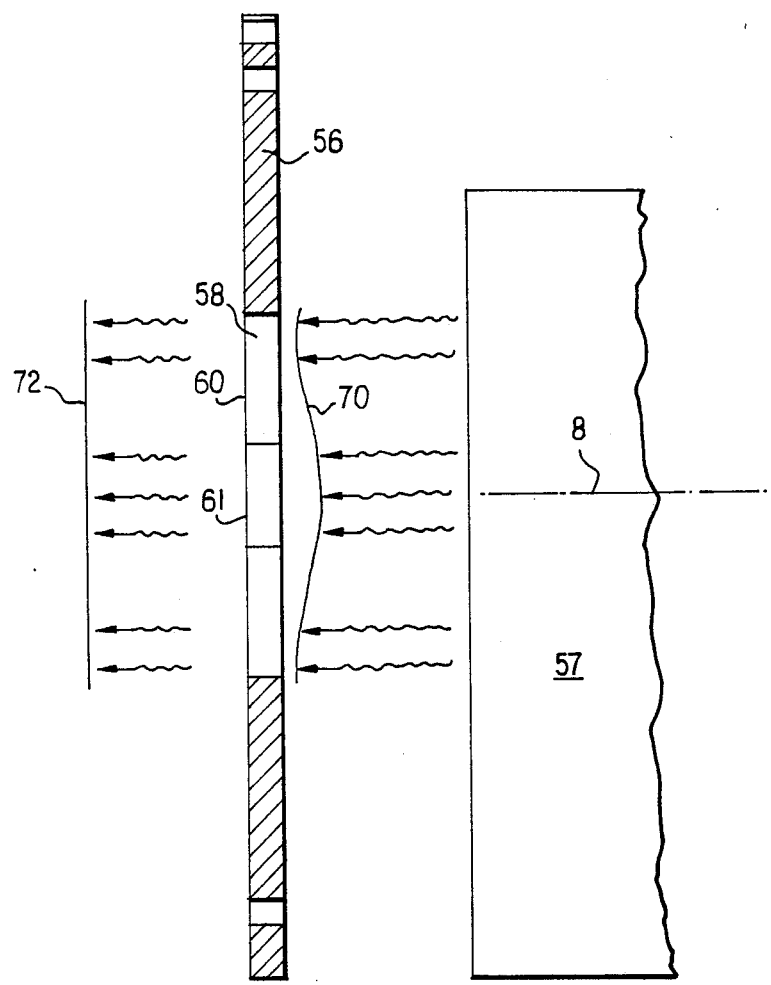
FIG. 5 is a partially schematic view illustrating the action of the flow restrictor plate of FIGS. 2 and 4 in equalizing batch flow.

Depending on the design, the restrictor plate will encourage batch flow or speed in one area and decrease batch flow in other areas, see FIGS. 4 and 5. What is intended is to provide equal batch flow or speed once it exits the flow restrictor. The design is dependent on extruding apparatus design, viscosity of the extruding material, and cell structure of the extruded body. Edge 60 of restrictor 56 is varied in particular areas, such as 61, to address and correct unequal velocities generated by a specific extruding apparatus 57. The restrictor plate will correct for such unequal velocities, as indicated by a velocity distribution curve 70. The unequal velocities are smoothed, as indicated by velocity distribution curve 72 of FIG. 5.

Figure 6:
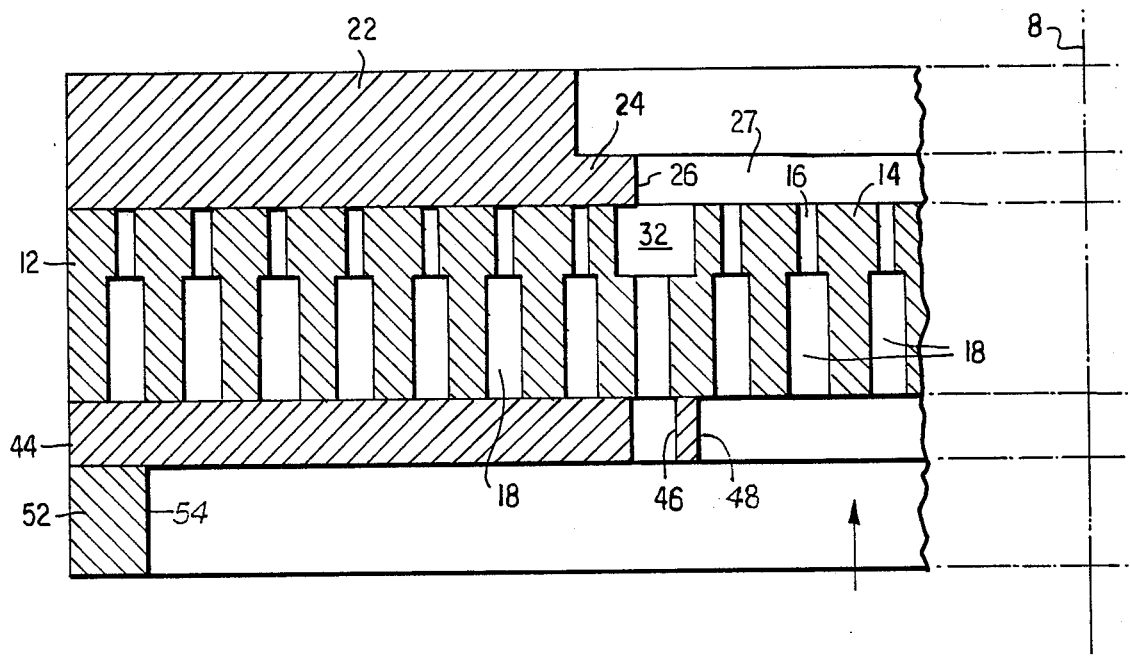
FIG. 6 is a view similar to FIG. 2 and illustrates a modification wherein a shim between the die outlet face and the mask is not employed.

In the extrusion of some types of thin walled honeycomb structures for special application, the need for skin thickness 3 to 20 times the web thickness is required. In these special applications where a constant shrinkage or no shrinkage batch composition is used, the no shim apparatus shown in FIG. 6 is employed. In this application, mask 22 remains a constant size, but can also be varied. The desired skin thickness is the relationship between edge 26 of the mask 22 and reservoir 32. As indicated at 32, those pins 14 between the discharge slots 16 which are axially aligned with the flow controlling openings 46 can be removed, as by plunge electric discharge machining (EDM), a technique known in this art. The removed annular region 32 of the discharge slots is usually of a cross sectional width greater than the width of the discharge slots 16. Removed annular region or reservoir 32 may be termed an annular groove. In practice, only entire pins 14 are removed by EDM to create annular zone 32. Openings 46 can be funnel shaped, with the wider ends aligned with and feeding feed holes 18. It is seen that a portion of annular groove or reservoir 32 is overlaid by inwardly of the die outlet face. The forming plate 44 is used to control batch flow to reservoir 32 with edge 48 of forming plate 44 being used to control cell distortion around the peripheral section of the honeycomb structure. If edge 26 size is radially increased, the skin will thicken, if edge 26 is radially decreased, the skin will be thinner.

We claim:

1. An extrusion die assembly for extruding a structure having a thickened outer skin, the assembly including an extrusion die having a plurality of axially extending and generally parallel feedholes, the die having an inlet face and an outlet face, the outlet face having a plurality of discharge slots, said discharge slots being arranged in criss crossing rows and columns, a plurality of axially extending pins integral with the die and located between the rows and columns of said discharge slots, a die mask at the periphery of the outlet face of the die, the mask having a radially inwardly extending lip axially spaced downstream from said pins and overlying an annularly continuous peripheral region of the die outlet face, the die mask axially spaced from the die outlet face by a shim to thereby define a shim reservoir between the die outlet face and the mask, said mask lip having an edge, said mask lip exerting a radially inwardly directed force on material being extruded through a central portion of the die to thereby form a thickened skin, a forming plate positioned over the die inlet face and in surface contact therewith, said forming plate having a central opening congruent with the cross sectional shape of the structure being extruded, the forming plate having a plurality of axially extending, flow controlling openings spaced radially outwardly from the edge of said forming plate central opening, each of said flow controlling openings being aligned with and adapted to feed the input end of at least one die feedhole, a portion of said forming plate between the edge of its central opening and its flow controlling openings blocking the inlet end of some of said feedholes at said die inlet face, said flow controlling openings being axially aligned with a portion of said shim reservoir, whereby batch material fed to the die assembly reaching the shim reservoir is separated from a main mass of batch material passing through the central opening in the forming plate.

2. The die assembly of claim 1 wherein said die mask and said forming plate are annular.

3. The die assembly of claim 1 wherein the die assembly extrudes a honeycomb structure.

4. The die assembly of claim 1 wherein the die mask is in contact with the discharge face of the die.

5. The die assembly of claim 1 wherein the edge of the mask lip is axially aligned with the edge of the forming plate central opening.

6. The die assembly of claim 1 wherein said flow controlling openings are of uniform size.

7. The die assembly of claim 1 wherein said flow controlling openings are of different sizes.

8. The die assembly of claim 1 wherein each of said flow controlling openings feeds more than a single die feedhole.

9. The die assembly of claim 1 including a restrictor plate having an opening, said restrictor plate being axially spaced from said forming plate and located upstream thereof.

10. The die assembly of claim 9 wherein the restrictor plate opening is elliptical.

11. An extrusion die assembly for extruding a structure having a thickened outer skin, the assembly including an extrusion die having a plurality of axially extending and generally parallel feedholes, the die having an inlet face and an outlet face, the outlet face having a plurality o discharge slots, said discharge slots being arranged in criss crossing rows and columns, a plurality of axially extending pins integral with the die and located between the rows and columns of said discharge slots, a die mask at the periphery of the outlet face of the die, the mask having a radially inwardly extending lip axially downstream from said pins and overlying a peripheral region of the die outlet face, said mask lip projection having an edge, said mask lip exerting a radially inwardly directed force on material being extruded through the central portion of the die to thereby form a thickened skin, an annular groove in the outlet face of said die, said annular groove being of a cross sectional width greater than that of said discharge slots, said annular groove aligned with and adapted to be fed by some of said feedholes, a forming plate positioned over the die inlet face and in surface contact therewith, said forming plate having a central opening congruent with the cross sectional shape of the structure being extruded, the forming plate having a plurality of axially extending, flow controlling openings spaced radially outwardly from the edge of said central opening, each of said flow controlling openings being aligned with and adapted to feed at least one die feedhole and also aligned with said annular groove, a portion of said forming plate between the edge of its central opening and its flow controlling openings blocking the inlet end of the lip of said die mask overlying a part of said annular groove, whereby the skin thickness can be varied by varying the radial position of said lip edge.

* * * * *

UNITED STATES PATENT AND TRADEMARK OFFICE
CERTIFICATE OF CORRECTION

PATENT NO. : 4,915,612

DATED : April 10, 1990

INVENTOR(S) : John R. Gangeme and Richard D. Putt

It is certified that error appears in the above-identified patent and that said Letters Patent is hereby corrected as shown below:

Col. 4, line 57, "holes" should be "hole"

Col. 5, line 57, insert "(upstream)" after "inwardly"

Col. 6, line 60, "o" should be "of"

Signed and Sealed this

Fifteenth Day of December, 1992

Attest:

DOUGLAS B. COMER

Attesting Officer        Acting Commissioner of Patents and Trademarks